UNITED STATES PATENT OFFICE.

THEODORE SPEABER, OF CHICAGO, ILLINOIS.

EMBALMING FLUID.

1,390,392.  Specification of Letters Patent.  Patented Sept. 13, 1921.

No Drawing.  Application filed May 27, 1921.  Serial No. 473,006.

*To all whom it may concern:*

Be it known that I, THEODORE SPEABER, a citizen of the United States, residing at Chicago, in the county of Cook and State of Illinois, have invented certain new and useful Improvements in Embalming Fluids, of which the following is a specification.

This invention relates to a fluid for embalming the dead. It has for its object to provide a fluid which, while maintaining all of the necessary efficiency as an antiseptic, will have the additional inherent quality of acting as a ready solvent for congealed blood, will prevent the forming of gases, and will avoid the delecterious effect upon the hands of the operator without detracting from the antiseptic effect of the solution, and will develop a satisfactory appearance in the subject.

The invention consists in adding to a solution which consists mainly of formaldehyde a constituent in the nature of citrate of magnesia. Preferably, the compound consists of approximately one fifth ($\frac{1}{5}$) of a solution of citrate of magnesia and four fifths ($\frac{4}{5}$) of formaldehyde, or a solution of formalin and water. The citric acid constituent will preferably consist of about twenty (20) ounces of magnesium carbonate, forty-five (45) ounces of citric acid, and three (3) gallons of water, and this solution is added to about sixteen (16) gallons and sixty-seven (67) ounces, of two thousand and forty (2040) ounces of formaldehyde. Or the compound can be put up in sixteen (16) ounce bottles by placing fourteen (14) ounces of full strength forty per cent. (40%) formaldehyde into the bottle and adding two (2) ounces of the citric acid, and the concentrated solution thus produced can be used by pouring it into a bottle having the capacity of about one half ($\frac{1}{2}$) gallon, and then filling such bottle with water to make one half ($\frac{1}{2}$) gallon of the fluid properly diluted for use.

I claim:

1. An embalming fluid composed of formaldehyde and citrate of magnesia.

2. An embalming fluid composed of formaldehyde and citrate of magnesia in the proportions of approximately one-fifth of the citrate of magnesia and four-fifths of formaldehyde.

3. An embalming fluid produced by compounding magnesium carbonate, citric acid, and water, and adding thereto formaldehyde.

4. An embalming fluid compounded of 20 ounces of magnesium carbonate, 45 ounces of citric acid, 3 gallons of water and about $16\frac{1}{2}$ gallons of formaldehyde.

Signed at Chicago, Illinois, this 25th day of May, 1921.

THEODORE SPEABER.